UNITED STATES PATENT OFFICE 2,035,030

PROCESS FOR OBTAINING ALKALI CYANIDES

Arnoud Willy van Seters, Dordrecht, Netherlands, assignor to N. V. Stikstofbindingsindustrie "Nederland", Dordrecht, Netherlands, a Dutch corporation No Drawing. Application July 26, 1933, Serial No. 682,353. In Germany August 4, 1932

10 Claims. (Cl. 23—79)

It is known to convert alkalisulphocyanates with alkaline earth metal oxides or -carbonates and carbon at elevated temperatures into alkalicyanides and alkaline earth metal sulphides.

When using sodiumsulphocyanate, calcium oxide and carbon the reaction may be represented by the following equations:

$$NaCNS + CaO = NaCNO + CaS$$
$$NaCNO + C = NaCN + CO$$
$$\overline{NaCNS + CaO + C = NaCN + CaS + CO}$$

This conversion has several drawbacks. It requires temperatures above 900° C. which are very detrimental for the material of the furnaces or retorts in which it is carried out. Also the yield of alkalicyanide is bad because in the course of the reaction decompositions occur according to the equations:

$$5NaCNO = 3NaCN + Na_2CO_3 + CO_2 + N_2$$
$$4NaCNO = 2NaCN + Na_2CO_3 + CO + N_2$$

Another drawback is the fusing of the reaction mixture caused by the required high temperature which prevents a continual passage of the materials through the furnace and causes a highly corrosive action on the walls of the furnace.

It is further known to convert sulphocyanates into cyanides by treating them at a raised temperature with hydrogen in the presence of zinc oxide, zinc hydroxide or zinc carbonate. This process has the drawback that water is formed by the reaction and decomposes a large part of the formed cyanide or cyanate according to the equations:

I. $2NaCN + 3H_2O = Na_2CO_3 + 2NH_3 + C$
II. $2NaCN + 4H_2O = Na_2CO_3 + 2NH_3 + CO + H_2$
III. $2NaCNO + 3H_2O = Na_2CO_3 + 2NH_3 + CO_2$

These so called saponifications decrease the yield of the conversion in such manner that only about one half of the sulphocyanate can be converted into cyanide.

If for instance 8 grams of a mixture containing 43.5% sodiumsulphocyanate and 56.5% ZnO are heated two hours at 600° C. in a current of hydrogen with a speed of 150 ccm./min. the following percentages of the nitrogen of the sodium-sulphocyanate are converted into:

| | Per cent | |
|---|---|---|
| Sodium cyanide | 47.9 | |
| Sodium cyanate | 6.6 | } 54.5 |
| Ammonia | 45.5 | |
| | 100 | |

It has now been found that alykalisulphocyanates can be converted into alkali cyanides with a good yield and without the above mentioned drawbacks if they are heated between 400–800° C. in the presence of alkaline earth metal oxides or carbonates with carbon monoxide or gases containing carbon monoxide, such as producer gas, water gas, mixtures of carbon monoxide and hydrocarbons, carbon monoxide and ammonia and the like.

Instead of the alkaline earth metal compounds heavy metal oxides or carbonates may be used, e. g. ferro carbonate, zinc oxide or the like.

If sodium sulpho cyanate, zinc oxide and carbonmonoxide are used the conversion is effected according to the equation:

$$NaCNS + ZnO = NaCNO + ZnS$$
$$NaCNO + CO = NaCN + CO_2$$
$$\overline{NaCNS + ZnO + CO = NaCN + ZnS + CO_2}$$

If 8 grams of the above mentioned mixture containing 43.5% NaCNS and 56.5% ZnO are heated two hours to 600° C. in a current of carbon monoxide with a speed of 150 ccm./min. the following percentages of the nitrogen of the sodiumsulphocyanate are recovered:

| | Percent | |
|---|---|---|
| As sodium cyanide | 74 | |
| As sodium cyanate | 19.5 | } 93.5 |
| As ammonia | 3.2 | |
| As $N_2$ (loss) | 3.3 | |
| | 100 | |

From these experiments it is clear that the conversion of sulphocyanate with zinc oxide and carbon monoxide gives a much better yield than with zinc oxide and hydrogen.

In technical practice for obtaining of alkali cyanides it is preferable to use cheaper desulphurizing agents such as chalk or burnt lime. In this case the reactions are represented by the equations:

$$NaCNS + CaO + CO = NaCN + CaS + CO_2$$
$$NaCNS + CaCO_3 + CO = NaCN + CaS + 2CO_2$$

If under otherwise the same conditions in each case 7 grams of a mixture containing 38% NaCNS and 62% $CaCO_3$ is heated two hours at 600° C., in one case in a stream of carbon monoxide, in the other case in a stream of hydrogen, both having a speed of 150 ccm./min., the following percentages of the nitrogen of the sodiumsulphocyanate are recovered:

|  | Case I (carbon monoxide) | Case II (hydrogen) |
| --- | --- | --- |
|  | Percent | Percent |
| As sodium cyanide | 54.6 | 46.1 |
| As sodium cyanate | 39.8 | 0.0 |
| As ammonia | 0.9 | 46.8 |
| As $N_2$ (loss) | 4.7 | 7.1 |
|  | 100 | 100 |

The reaction product obtained by heating the mixture two hours in a stream of carbon monoxide, contains besides cyanide a high percentage of sodium cyanate, but this may be converted into cyanide by a continued treatment with carbon monoxide, so that a crude product is obtained which besides sodium cyanide contains substantially only calcium sulphide.

If this crude product is treated with a suitable solvent for alkali cyanide such as anhydrous liquid ammonia or amines, then another preferably non-aqueous liquid capable of keeping the accompanying impurities in solution, such as alcohols, is added and thereafter the first mentioned more volatile solvent is evaporated partly or wholly, a sodium cyanide with a purity of 96–98% NaCN may be obtained, because calcium sulphide is wholly insoluble in these liquids and soluble impurities such as sodium sulphide are absent. Instead of mixing the other liquid only after the extraction of the crude reaction product with the more volatile solvent, it may be added to it before or during the said extraction. Excellent results are obtained if the extraction is carried out with a mixture of solvents, formed of a more volatile good solvent and a less volatile poor solvent, according to British Patent 382,372 (French Patent 722,795) such as a mixture of anhydrous ammonia and commercial concentrated ethyl- or methyl alcohol. If the ammonia is evaporated from the extract, alkali cyanide crystallizes out in well formed crystals of 96–98% or even higher purity, which can be easily separated from the mother liquid, which, after resaturation with anhydrous (preferably liquid) ammonia is ready for a further extraction.

What I claim is:—

1. A process for the production of alkali cyanides which comprises mixing an alkali sulfocyanate with zinc oxide and treating the mixture at a temperature between 400 and 800° C. with a gas containing carbon monoxide.

2. A process for the production of alkali cyanides which comprises mixing an alkali sulfocyanate with zinc oxide and treating the mixture at a temperature of about 600° C. with a gas containing carbon monoxide.

3. A process for the production of alkali cyanides which comprises mixing an alkali sulfocyanate with calcium oxide and treating the mixture at a temperature between 400 and 800° C. with a gas containing carbon monoxide.

4. A process for the production of alkali cyanides which comprises mixing an alkali sulfocyanate with calcium oxide and treating the mixture at a temperature of about 600° C. with a gas containing carbon monoxide.

5. In processes for the production of alkali cyanides by treating alkali sulfocyanates with reducing agents at elevated temperatures in the presence of a metal compound of the group consisting of the oxides, hydroxides and carbonates of metals capable of binding the sulfur content of the sulfocyanate, the step which consists in treating a sulfocyanate in the presence of such metal compound at a temperature between 400° C. and 800° C. with a gas containing carbon monoxide.

6. Process for the production of alkali cyanides as defined in claim 5 in which the sulfocyanate is treated with the carbon monoxide containing gas at about 600° C.

7. Process for the production of alkali cyanides as defined in claim 5 in which the gas containing carbon monoxide contains also a hydrocarbon.

8. Process for the production of alkali cyanides as defined in claim 5 in which the gas containing carbon monoxide is producer gas.

9. Process for the production of alkali cyanides as defined in claim 5 in which the gas containing carbon monoxide contains also ammonia.

10. Process for the production of alkali cyanides as defined in claim 5 in which more than a chemically equivalent amount of the metal compound is employed.

ARNOUD WILLY van SETERS.